(12) United States Patent
Faulkner et al.

(10) Patent No.: US 11,971,597 B2
(45) Date of Patent: Apr. 30, 2024

(54) OPTICAL DISTRIBUTION SYSTEM AND RELATED METHODS

(71) Applicant: CORNING RESEARCH & DEVELOPMENT CORPORATION, Corning, NY (US)

(72) Inventors: Michael Todd Faulkner, Granite Falls, NC (US); Lars Kristian Nielsen, Denver, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 18/187,727

(22) Filed: Mar. 22, 2023

(65) Prior Publication Data
US 2023/0305253 A1 Sep. 28, 2023

Related U.S. Application Data

(60) Provisional application No. 63/324,412, filed on Mar. 28, 2022.

(51) Int. Cl.
*G02B 6/00* (2006.01)
*G02B 6/44* (2006.01)
*G02B 6/50* (2006.01)

(52) U.S. Cl.
CPC ......... *G02B 6/4452* (2013.01); *G02B 6/4454* (2013.01); *G02B 6/4471* (2013.01); *G02B 6/50* (2013.01)

(58) Field of Classification Search
CPC .. G02B 6/4452; G02B 6/4454; G02B 6/4471; G02B 6/50; G02B 6/3885; G02B 6/44528; G02B 6/44465; G02B 6/00
See application file for complete search history.

(56) References Cited

U.S. PATENT DOCUMENTS

| 8,649,649 B2* | 2/2014 | Smith ...................... G02B 6/46 385/136 |
| 8,909,019 B2* | 12/2014 | Fabrykowski ....... G02B 6/4446 385/134 |
| 10,359,577 B2 | 7/2019 | Dannoux et al. |
| 10,379,298 B2 | 8/2019 | Dannoux et al. |

(Continued)

FOREIGN PATENT DOCUMENTS

| WO | 2019/143510 A1 | 7/2019 |
| WO | 2022/047276 A1 | 3/2022 |

OTHER PUBLICATIONS

International Search Report and Written Opinion of the International Searching Authority; PCT/US2023/015859; dated Jul. 7, 2023, 12 pages; European Patent Office.

*Primary Examiner* — Jennifer Doan
(74) *Attorney, Agent, or Firm* — Adam R. Weeks

(57) ABSTRACT

Optical distribution systems for data centers or similar networks are disclosed, where one or both ends of a high fiber-count backbone cable branch out once to serve multiple buildings. The optical distribution systems include the backbone cable, an enclosure that receives an end portion of the backbone cable, a plurality of tether cables connected to the backbone cable within a sealed interior of the enclosure and extending from the enclosure, and a plurality of multi-port terminals each receiving one of the tether cables and including connection ports for an auxiliary cable that can extend to one of the buildings. Related methods are also disclosed.

14 Claims, 8 Drawing Sheets

(56) References Cited

U.S. PATENT DOCUMENTS

| | | |
|---|---|---|
| 10,429,594 B2 | 10/2019 | Dannoux et al. |
| 10,545,305 B2 | 1/2020 | Leeman et al. |
| 10,802,228 B2 | 10/2020 | Dannoux et al. |
| 10,809,463 B2 | 10/2020 | Dannoux et al. |
| 11,262,509 B2 | 3/2022 | Rosson |
| 11,287,581 B2 | 3/2022 | Rosson |
| 11,287,582 B2 | 3/2022 | Rosson |
| 11,300,735 B2 | 4/2022 | Rosson |
| 11,460,646 B2 | 10/2022 | Dannoux et al. |
| 2009/0074369 A1* | 3/2009 | Bolton .............. G02B 6/3889 385/135 |
| 2017/0153407 A1 | 6/2017 | Van Baelen et al. |
| 2017/0212321 A1 | 7/2017 | Gronvall et al. |
| 2020/0158962 A1 | 5/2020 | Cote et al. |

\* cited by examiner

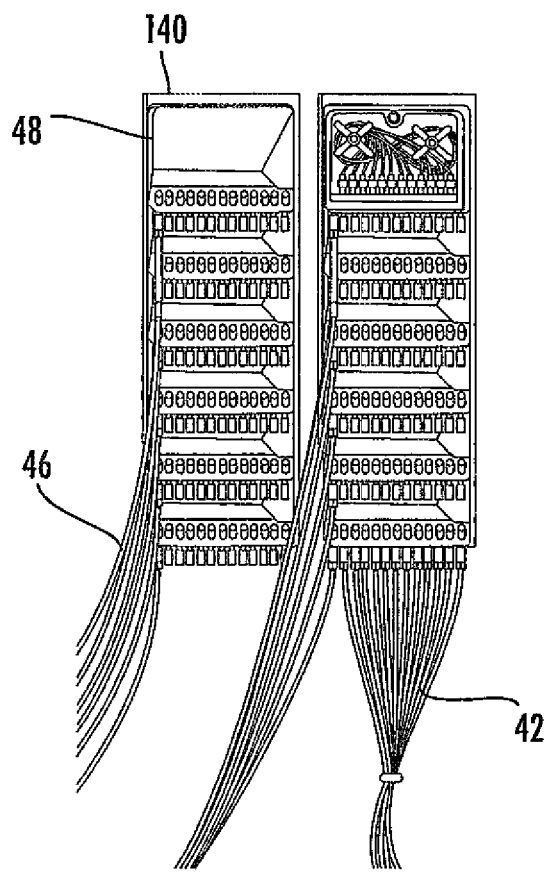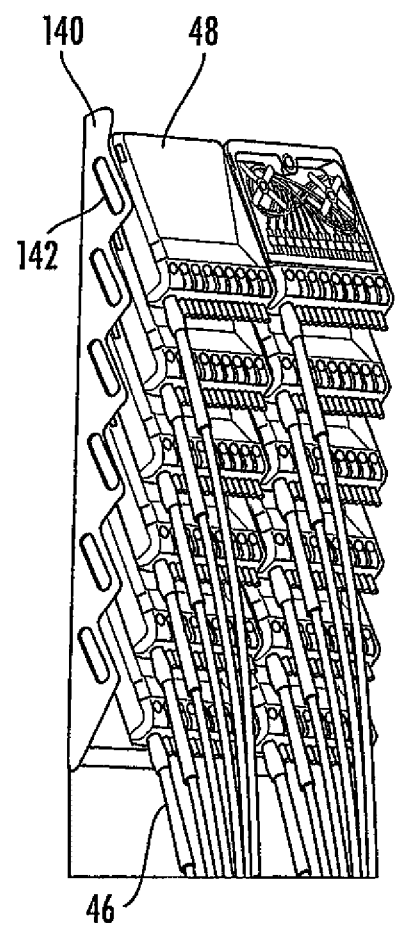
FIG. 11
FIG. 12

OPTICAL DISTRIBUTION SYSTEM AND RELATED METHODS

PRIORITY APPLICATION

This application claims the benefit of priority of U.S. Provisional Application No. 63/324,412, filed on Mar. 28, 2022, the content of which is relied upon and incorporated herein by reference in its entirety.

FIELD

This disclosure relates generally to optical connectivity, and more particularly to an optical distribution system involving a high fiber-count backbone cable having at least one end that is in a below-ground vault and that is used to connect to multiple buildings of a data center or other multi-building campus.

BACKGROUND

Large amounts of data and other information transmitted over the internet has led businesses and other organizations to develop large scale data centers for organizing, processing, storing, and/or disseminating large amounts of data. Data centers contain a wide range of communication equipment including, for example, servers, networking switches, routers, storage subsystems, etc. Data centers further include a large amount of cabling and equipment racks to organize and interconnect the communication equipment in the data center. For example, optical fiber cables and rack-mounted hardware to support optical connections are used extensively in data centers. Optical fibers can support very high bandwidths with lower signal loss compared to traditional data transmission mediums (e.g., copper wires).

The connections between communication equipment in large-scale data centers is typically not confined to a single building. May modern data centers are multi-building campuses where the multiple buildings on the campus are interconnected by a local fiber optic network. High fiber-count optical cables serve as the backbone for the network and are sometimes referred to as "backbone cables". Many data centers today require backbone cables with thousands of optical fibers; fiber-counts of 3,456 optical fibers or even 6,912 optical fibers are becoming more common, and future backbone cables may include even greater numbers of optical fibers (e.g., 13,824) to help meet the ever-increasing demands of data centers.

FIG. 1 schematically illustrates one example of a backbone cable 12 in a data center 10 that includes multiple buildings 14. The backbone cable 12 in this example extends between two vaults 16 positioned outside the buildings 14. The vaults 16 may be underground and used to store splice enclosures (below grade terminals; not shown) that protect connections between the backbone cable 12 and various auxiliary cables 18 that are used to connect to distribution equipment (not shown) within the buildings 14. Although multiple buildings 14 are shown as being associated with each vault 16, in alternative data center designs each vault 16 may service a single building 14 and/or multiple auxiliary cables 18 may extend from each vault 16 to the associated building(s) 14.

The connections between high fiber-count backbone cables 12 and auxiliary cables 18 are typically in the form of fusion splices. The splices are stored and organized in splice trays of the splice enclosures. There are several challenges with this traditional approach. For example, the amount of labor and time required to complete thousands of fusion splices is significant. Fusion-splicing is also very operator-dependent; the quality of the splicing and the attenuation of the optical signal through the fusion splice may vary widely depending on the field technicians' skill and experience.

Second, fusion splicing can be disruptive if the various buildings 14 are connected to the backbone cable 12 at different times. For example, it may only be necessary to connect a first or second building 14 associated with one of the vaults 16 when the data center 10 is first built. The data center 10 may be operational with those buildings 14 for a period of time before expansion is needed to connect equipment in an additional (e.g., third) building 14 associated with the vault 16. This requires opening the splice enclosure that contains the end of the backbone cable 12 to perform additional fusion splicing for connecting optical fibers of the backbone cable 12 to optical fibers of the auxiliary cable(s) 18 that are associated with the additional building 14. Because of the potential to disrupt the previous fusion splices to other auxiliary cables 18, the data center operator typically takes the other buildings "offline" while the additional fusion splicing is complete. This lost operation time can have significant financial impact for the data center owner.

SUMMARY

Embodiments of optical distribution systems and methods related to such systems are provided in this disclosure. The optical distribution systems are for connecting buildings of a network, such as buildings of a data center network.

According one embodiment, the optical distribution system comprises: a backbone cable, an enclosure, a plurality of tether cables, and a plurality of multiport terminals. The backbone cable carries a plurality of optical fibers. The enclosure receives is configured to provide a sealed interior into which an end portion of the backbone cable extends. The plurality of tether cables each have optical fibers connected to the optical fibers of the backbone cable within the sealed interior of the enclosure. Each tether cable also extends from the enclosure. The plurality of multiport terminals each receive an end portion of a respective tether cable of the plurality of tether cables. Additionally, each multiport terminal of the plurality of multiport terminals is configured to maintain a sealed interface with the respective tether cable and includes a plurality of connection ports configured to receive a plurality of outdoor optical connectors on a front side of the plurality of connection ports. The optical fibers of the respective tether cable are pre-terminated with connection interfaces that are each received in a back side of a respective connection port of the plurality of connection ports.

According to one aspect or embodiment, the optical fibers carried by the backbone cable are pre-terminated with connection interfaces such as multifiber ferrules or optical connectors that include such ferrules. The plurality of tether cables are likewise pre-terminated, such that the enclosure is a patch enclosure that manages mated pairs of the connection interfaces (mated connections) between the optical fibers of the backbone cable and the optical fibers of the plurality of tether cables.

According to another aspect or embodiment, a method of connecting buildings of a networks installing an optical distribution system according to either of the two preceding paragraphs of this Summary section. The method further comprises: connecting a first building to the network by connecting one end of an auxiliary cable to a first multiport terminal of the plurality of multiport terminals and an opposite end of the auxiliary cable to communication equipment within the first building, wherein the auxiliary cable is pre-terminated with a plurality of outdoor optical connectors that are received in the front side of the plurality of connection ports of the first multiport terminal; and operating the network such that backbone cable carries live network traffic for the first building.

In a further aspect or embodiment, the method additionally comprises: connecting an additional building to the network by connecting one end of a second auxiliary cable to an second multiport terminal of the plurality of multiport terminals and an opposite end of the auxiliary cable to communication equipment within the first building, wherein the auxiliary cable is pre-terminated with a plurality of outdoor optical connectors that are received in the front side of the plurality of connection ports of the first multiport terminal. The backbone cable continues to carry live network traffic for the first building while connecting the additional building to the network.

Additional features and various advantages will be set out in the description that follows, and in part will be readily apparent to those skilled in the technical field of optical connectivity.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 11 is an illustration of one example how the outdoor multiport terminals of FIG. 4 may be arranged in optical distribution systems according to this disclosure, wherein adjacent outdoor multiport terminals partially overlap each other to provide a stacked arrangement, respective outdoor tether cables extend into each of the outdoor multiport terminals, and a representative auxiliary cable extends from ports of one of the outdoor multiport terminals.

FIG. 12 is another illustration of the arrangement of FIG. 11, illustrating the stacked arrangement of the outdoor multiport terminals from a different viewpoint.

DETAILED DESCRIPTION

Figure 1:
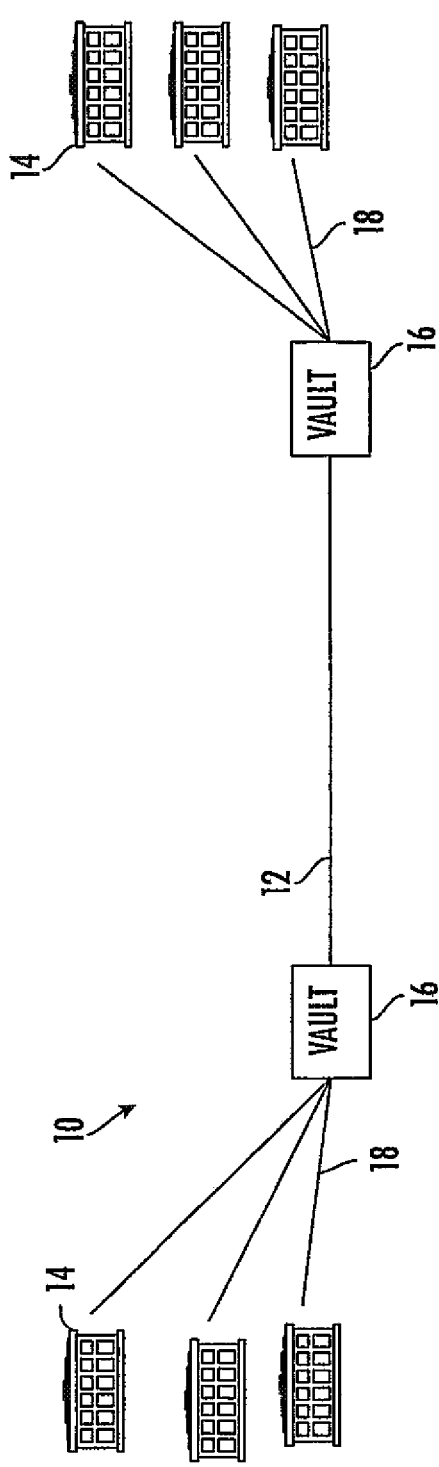
FIG. 1 is a schematic illustration of one example of a data center having multiple buildings interconnected by a backbone cable.

Various embodiments will be clarified by examples in the description below. In general, the description relates to optical distribution systems for data centers or other applications where one or both ends of a high fiber-count backbone cable branch out once to serve multiple buildings. In other words, the multiple buildings served by one of the ends of the backbone cable are separate branches of the optical distribution system; they are not connected in series. The data center 10 of FIG. 1 is one example of such a data center. However, unlike traditional networks for the data center 10, optical distribution systems according to this disclosure facilitate installations by avoiding the need for fusion splicing in the field and by providing arrangements that allow previously connected buildings to remain online when connecting additional buildings to the data center network. Various cables included as part of optical distribution systems according to this disclosure may be pre-terminated with connection interfaces (e.g., ferrules or complete optical connectors) that allow mating with corresponding connection interfaces using an adapter. As used in this disclosure, the word "pre-terminated" refers to terminations that take place by the manufacturer of the cable, prior to deployment to customers, customer sites, etc. ("the field"). Additionally, the word "connection interface" refers to an optical connector, optical connector sub-assembly, or one or more optical connector components, such as ferrules, that facilitate coupling of the optical fibers on which they are installed to other optical fibers that are terminated with a same or different connector interface.

Figure 2:
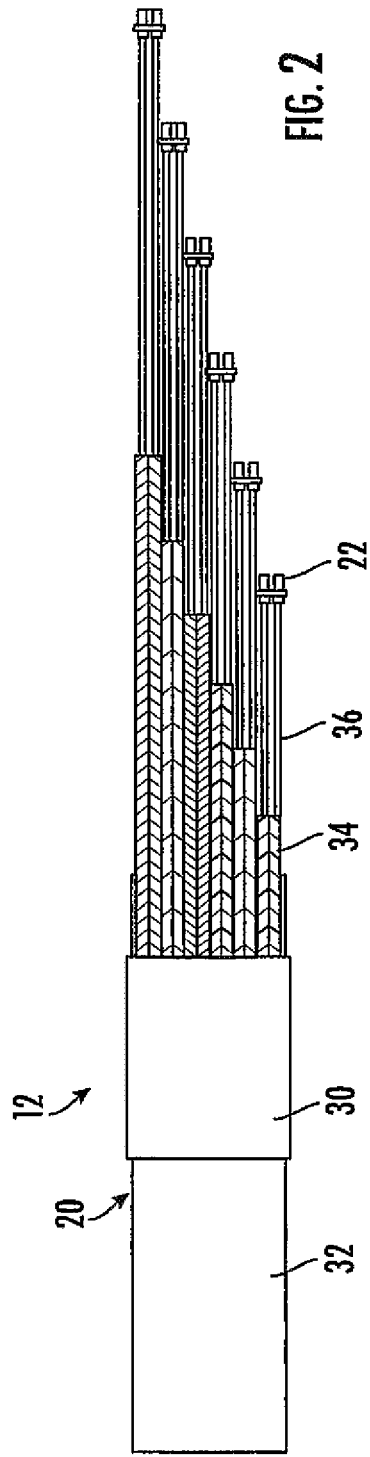
FIG. 2 is a schematic illustration of an end portion of an example high fiber-count pre-terminated cable.

For example, FIG. 2 schematically illustrates an end portion 20 of a backbone cable 12 pre-terminated with a plurality of ferrules 22 that serve as connection interfaces. The termination involves not only the installation of ferrules 22, but also preparing the end portion 20 of the backbone cable 12 for such installation. To this end, the pre-terminated backbone cable 12 includes a furcation body 30 associated with a first end of a cable jacket 32 and plurality of subunits 34 that extend from the furcation body 30. The subunits 34 each contain multiple groupings of optical fibers 36, although only a single grouping for each subunit 34 is shown in FIG. 2 for convenience. Each grouping may include a multiple of eight or twelve optical fibers 36, potentially with the optical fibers 36 in a ribbonized form (i.e., held in an ordered manner by a matrix material encapsulating or intermittently applied to the optical fibers 36). For example, each subunit 34 may include twelve groupings that each have twelve optical fibers (144 fiber count per subunit), twelve groupings that each have twenty-four optical fibers (288 fiber count per subunit), thirty-six groupings that each have eight optical fibers (288 fiber count per subunit), twenty-four groupings that each have twelve optical fibers (288 fiber count per subunit), or the like. Additional details of the example design shown in FIG. 2 can be found in U.S. Patent Pub. No. 2021/0080669 ("the '669 publication"), the disclosure of which is fully incorporated herein by reference.

Figure 3:
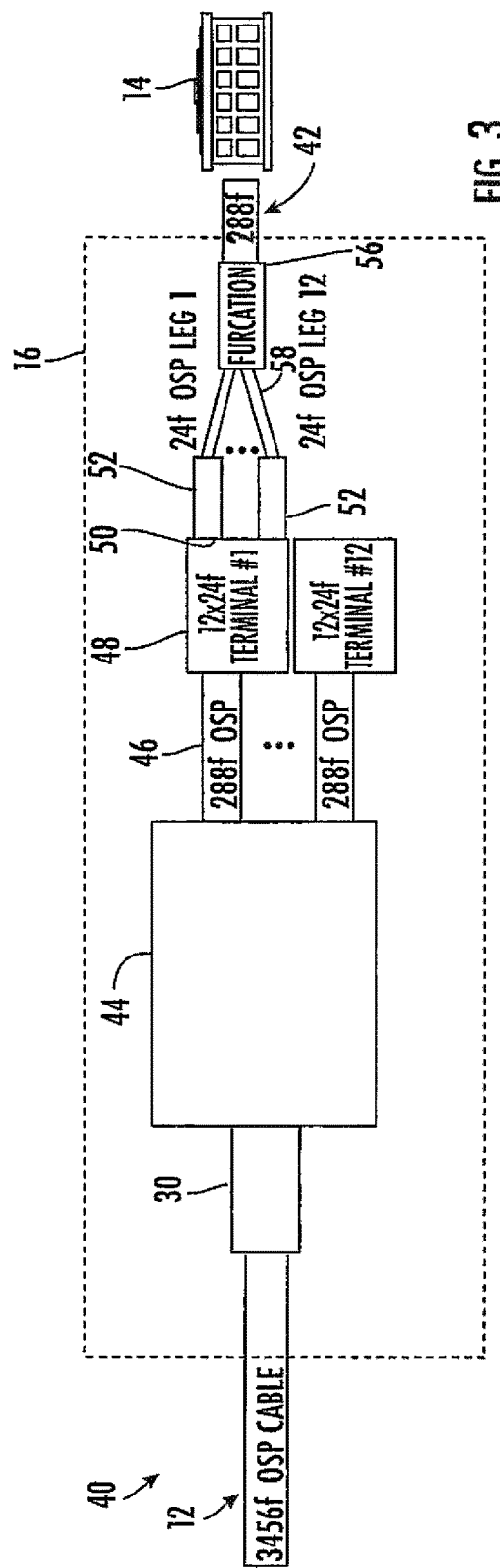
FIG. 3 is a schematic illustration of one embodiment of an optical distribution system for a data center according to this disclosure.

With the above in mind, FIG. 3 is a schematic illustration of one embodiment of an optical distribution system 40 for the data center 10 (FIG. 1). The dashed lines in FIG. 3 represent one of the vaults 16 of the data center 10. The backbone cable 12 extends into the vault 16, and auxiliary cables 42 extend out of the vault to the buildings 14 like FIG. 1. Only one auxiliary cable 42 and one building 14 are shown in FIG. 3 to simplify the drawing.

The difference from conventional solutions relates to the components of the optical distribution system 40 and their use. A general overview of the optical distribution system 40 will first be discussed before describing the components in further detail.

To this end, within the vault 16, an end of the backbone cable 12 is received in an outdoor patch enclosure 44, which also receives ends of outdoor tether cables 46. Connections are established between the backbone cable 12 and the outdoor tether cables 46 within the outdoor patch enclosure 44 using the connection interfaces pre-installed on the backbone cable 12 and the outdoor tether cables 46, as will be described in greater detail below. The outdoor tether cables 46 extend a short distance to respective outdoor multiport terminals 48 positioned within the vault 16. For example, the outdoor tether cables 46 may be less than 100 m, less than 50 m, or even less than 10 m so that the outdoor multiport terminals 48 can be placed in the vault 16 with the outdoor patch enclosure 44 without having to store excessive amounts of cable slack.

The ends of the outdoor tether cables 46 that are received within the outdoor multiport terminals 48 are pre-terminated with optical connectors (not shown in FIG. 3). In other words, optical connectors are pre-installed on the ends of the outdoor tether cables 46 to terminate groups of optical fibers that are carried by the outdoor tether cables 46. These optical connectors are received in the back of connection ports 50 that are provided on a face of the outdoor multiport terminals 48. Outdoor optical connectors 52 are received in the front of the connection ports 50, which function as receptacles that establish connections between the optical connectors of the outdoor tether cables 46 and the outdoor optical connectors 52. As schematically shown in FIG. 3, the outdoor optical connectors 52 define terminated ends of the auxiliary cables 42. More specifically, end sections of the auxiliary cables 42 that extend into the vault 16 each include a furcation body 56 that branches out the auxiliary cable 42 into cable legs 58. Each cable leg 58 is pre-terminated with one of the outdoor optical connectors 52.

The term "outdoor" is used in connection with various elements (e.g., outdoor patch enclosure 44, outdoor tether cable 46, outdoor multiport terminal 48, outdoor optical connector 52) to designate that the elements are suitable for outdoor environments. For example, the outdoor patch enclosure 44 is designed to receive the backbone cable 12 and the outdoor tether cables 46 through sealed interfaces and otherwise be configured to provide a sealed interior. The outdoor multiport terminals 48 similarly receive the outdoor tether cables 46 through sealed interfaces and are configured to provide a sealed interior. Although each outdoor multiport terminal 48 includes multiple connection ports 50, sealed connections are made between the connection ports 50 and the outdoor optical connectors 52 so that the interior of the outdoor multiport terminals 48 can remained sealed from the external environment. The various outdoor elements introduced above are referred to below without using the term "outdoor" for convenience; it will be understood that the elements are "outdoor" elements based on the introduction already provided.

Figure 4:
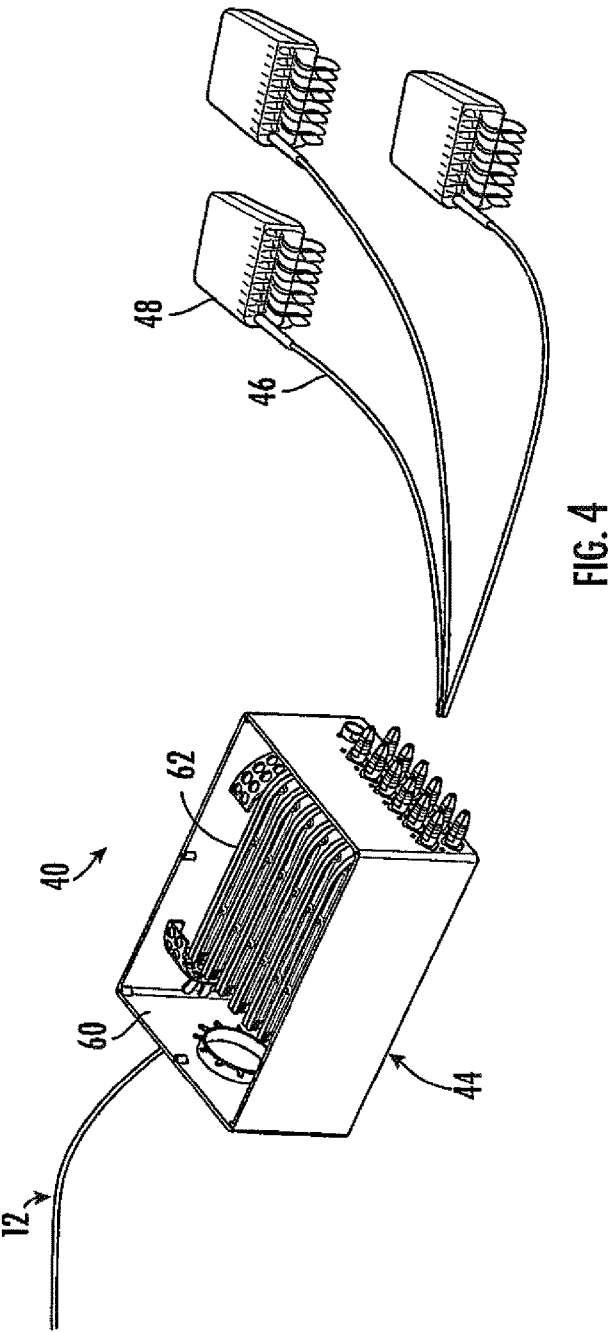
FIG. 4 is a schematic perspective view of an example outdoor patch enclosure and example outdoor multiport terminals tethered to the outdoor patch enclosure by outdoor tether cables, representing an example implementation of the optical distribution system of FIG. 3, wherein the patch enclosure is shown without a cover to illustrate an interior of the patch enclosure including a plurality of patch trays.

The schematic illustration of the optical distribution system 40 in FIG. 3 can be better appreciated with additional reference to FIG. 4, which illustrates an example embodiment of the patch enclosure 44 and multiport terminals 48. The backbone cable 12 is schematically shown in FIG. 4 as extending to a first side 60 of the patch enclosure 44. The manner in which the backbone cable 12 interfaces with the patch enclosure 44 will be described in greater detail below, as will other details of the patch enclosure 44. The patch enclosure 44 is shown without a cover in FIG. 4 to illustrate patch trays 62 that are housed in the interior of the patch enclosure 44. Although not shown in FIG. 4, it will be appreciated from the remainder of this description that the patch trays 62 are used to establish connections between the connection interfaces that terminate the backbone cable 12 and the connection interfaces that terminate the tether cables 46. FIG. 4 schematically illustrates three tether cables 46 extending from the patch enclosure 44 to three multiport terminals 48. Only three tether cables 46 and three multiport terminals 48 are shown to simplify the drawings; there may be a greater number of tether cables (each extending to a respective multiport terminal) to provide an overall number of optical fibers that corresponds to the number of optical fibers carried by the backbone cable 12. The multiport terminals 48 are shown as 12-port Evolv™ terminals available from Corning Optical Communications LLC ("Corning"). Such terminals are compatible with outdoor connectors from Corning referred to as Pushlok™ connectors. Additional details relating to these outdoor terminals and outdoor connectors, and variants thereof, can be found in the following patent or patent application publication numbers: U.S. Pat. Nos. 10,359,577; 10,379,298; 10,802,228; 10,809,463; US2020/0103599; US2020/0057205; and US2020/0096710, wherein the disclosures of each of the foregoing publications (collectively "the Corning Pushlok Publications") are fully incorporated herein by reference.

In alternative embodiments, the connection ports of the multiport terminals may be configured for other types of outdoor optical connectors. For example, the multiport terminals may be configured to be compatible with OptiTap® connectors from Corning, FastConnect™ connectors sold by Huawei Technologies Co., Ltd., DLX® connectors sold by CommScope, Inc. of North Carolina ("CommScope"), or Prodigy™ connectors sold by CommScope. These and other outdoor optical connectors are sometimes referred to as ruggedized optical connectors or hardened optical connectors because of their robustness and environmental sealing features.

Still referring to both FIGS. 3 and 4, the furcation body 30 of the backbone cable 12 is secured to the first side 60 of the patch enclosure 44. The '669 publication referenced above discloses how the furcation body 30 may be designed to removably couple to a pulling grip assembly using a mechanical interface. The same principles may apply for removably coupling the furcation body 30 to the patch enclosure 44. In other words, the first side 60 of the patch enclosure 44 may include a coupling element (not shown) configured to establish a connection with the furcation body 30 and allow the subunits 34 (FIG. 2) of the backbone cable 12 to extend through an opening 66 in the first side 60 and into the interior of the patch enclosure 44. Other ways of securing the backbone cable 12 to the patch enclosure will be appreciated by skilled persons.

Figure 6:
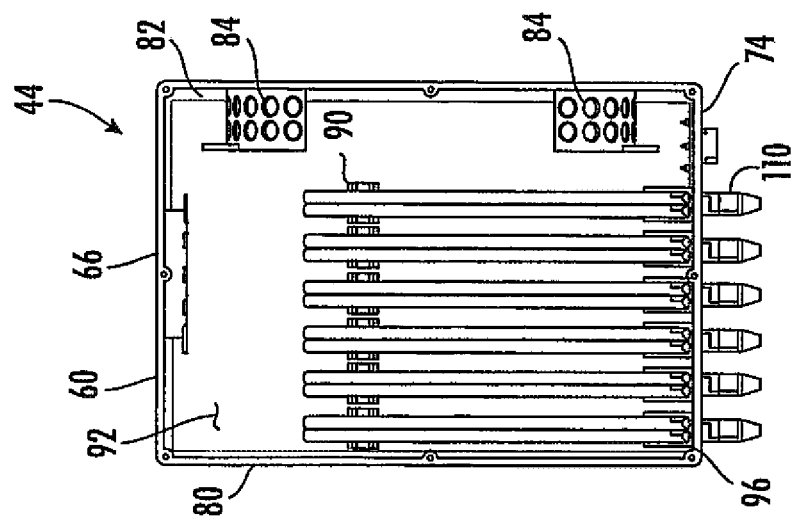
FIG. 6 is a top view of the outdoor patch enclosure of FIGS. 4 and 5, again shown without a cover to illustrate the interior of the patch enclosure and how the patch trays are arranged therein.
Figure 5:
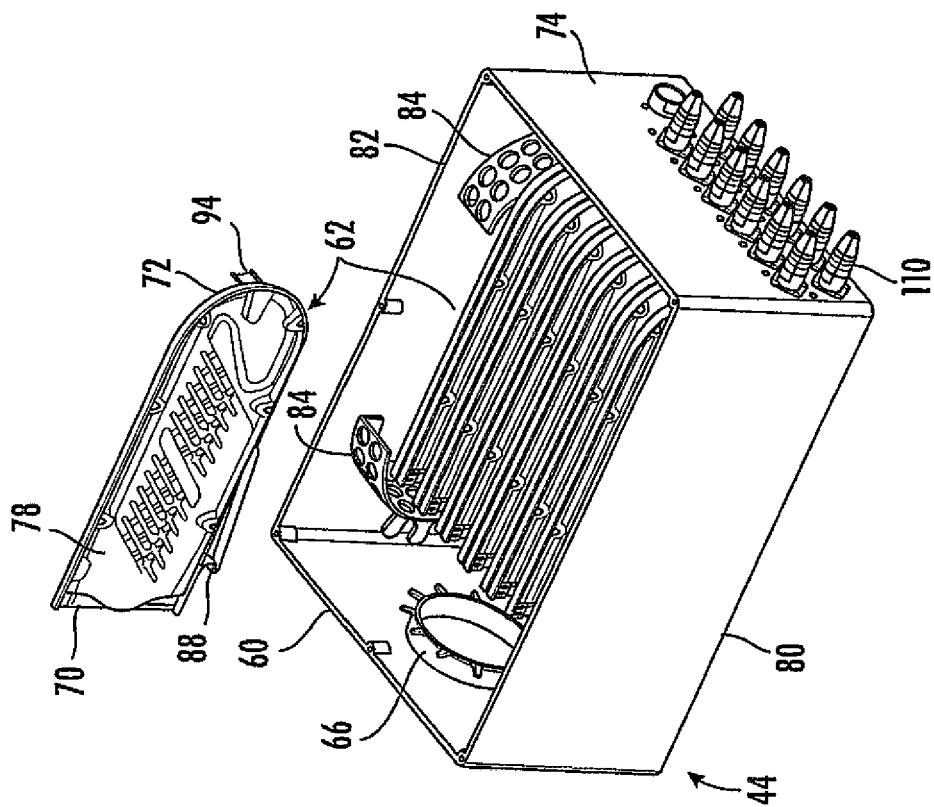
FIG. 5 is a perspective of the of the outdoor patch enclosure of FIG. 4 with a patch tray removed from the patch enclosure.

FIGS. 5 and 6 illustrate the patch enclosure 44 and one of the patch trays 62 in further detail. The patch trays 62 are positioned adjacent to each other within the interior of the patch enclosure 44. More specifically, the patch trays 62 each include a first, inlet end 70 and a second, closed end 72. The inlet end 70 is configured to receive optical fibers from the backbone cable 12 and tether cables 46 that are configured to be connected. The patch trays 62 are arranged adjacent to each other with their respective inlet ends 70 facing the first side 60 of the patch enclosure 44 and their respective closed ends 72 facing an opposite second side 74 of the patch enclosure 44 that includes openings 76 (FIG. 9) for the tether cables 46. In other embodiments, the patch trays 62 may be oriented in an opposite manner with the inlet ends 70 facing the second side 74 of the patch enclosure 44 and the closed ends 72 facing the first side 60.

Still referring to FIGS. 5 and 6, each patch tray 62 also includes a base wall 78 configured to support connections on one side ("connection side") of the patch tray 62. The patch trays 62 are grouped in pairs, with the connection side of each patch tray 62 in a pair facing away from the other patch tray 62 in the pair. Such an arrangement may facilitate managing the large number of optical fibers and connections associated with the patch trays 62. Collectively, the patch trays 62 are positioned closer to one side wall 80 of the patch enclosure 44 than to an opposite side wall 82 of the patch enclosure 44. This results in space between an outermost patch tray 62 and the opposite side wall 82 for storing excess length of optical fiber and/or cable. Slack management devices 84 are mounted on the side wall 82 for this purpose.

Figure 7:
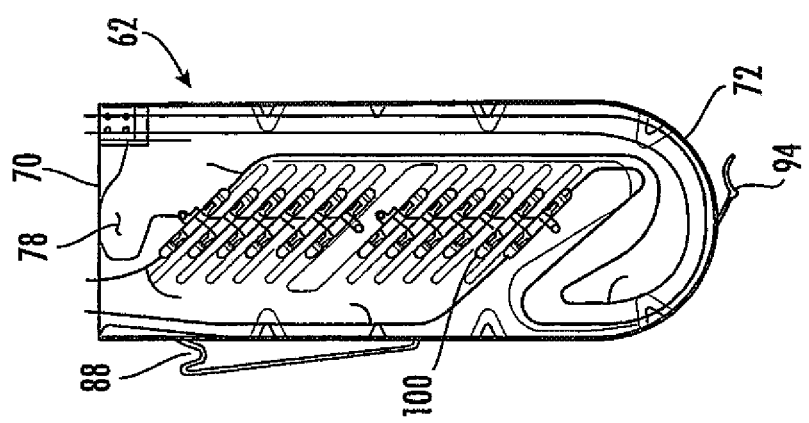
FIG. 7 is a top view of one of the patch trays of the outdoor patch enclosure of FIG. 4.

The patch trays 62 are removably mounted within the patch enclosure 44. In particular, the patch trays 62 are designed with a hook-like portion 88 or other engagement feature for cooperating with a corresponding engagement feature 90 (e.g., support bar) secured to a base wall 92 of the patch enclosure 44. Each patch tray 62 also includes a latching feature 94 on its closed end 72 for cooperating with a corresponding latching feature 96 on the wall that defines the second side 74 of the patch enclosure 44. In terms of how optical connections can be supported on the patch trays 62, reference can be made to the '669 publication mentioned above. Indeed, the patch trays 62 may be the same or similar to any of those disclosed in the '669 publication. FIG. 7 schematically illustrates one patch tray 62 and two optical connections: one between a first grouping of optical fibers 36 of a first subunit 34 (FIG. 2) and a first grouping of optical fibers 98 of one of the tether cables 46, and one between a twelfth grouping of optical fibers 36 of the first subunit 34 and a twelfth grouping of optical fibers 98 of the tether cable 46. The optical connections are established using adapters 100 supported on the patch tray 62, as disclosed in the '669 publication.

Figure 8:
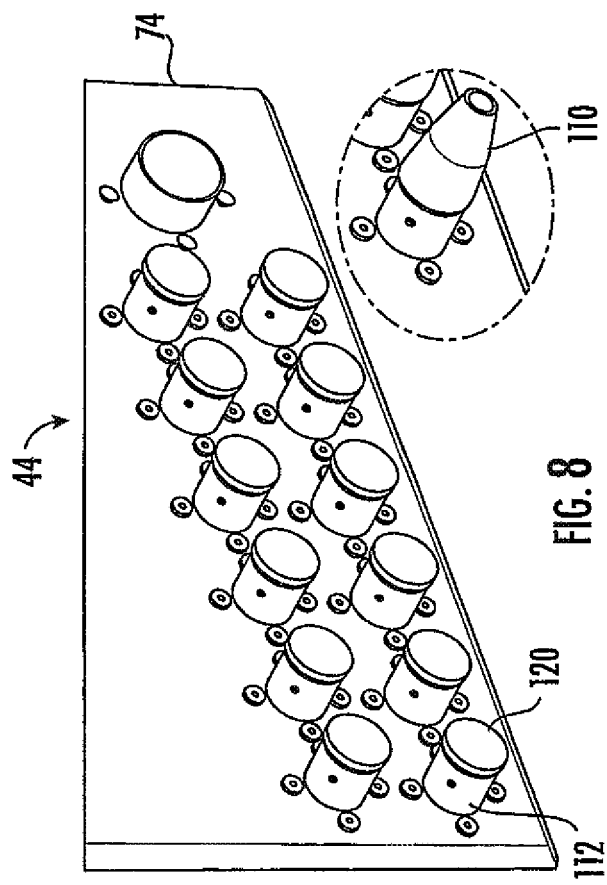
FIG. 8 is a perspective view of one side of the outdoor patch enclosure of FIG. 4 illustrating sealing caps installed on coupling elements that are associated with openings in the side of the patch enclosure.
Figure 9:
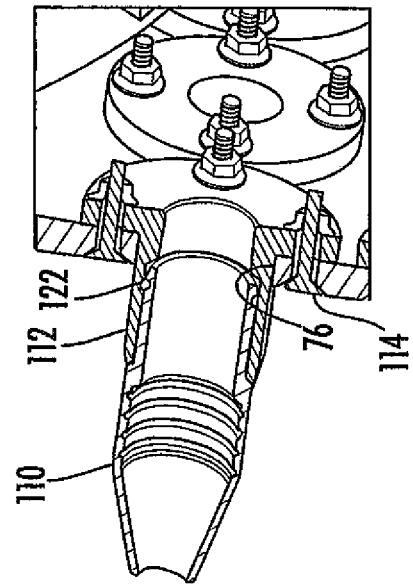
FIG. 9 is a cross-sectional perspective view of an example furcation body secured to one of the coupling elements of the outdoor patch enclosure.

In FIGS. 5 and 6, the second side 74 of the patch enclosure 44 is illustrated with furcation bodies 110 secured to coupling elements 112 that are associated with the openings 76 for the tether cables 46. The furcation bodies 110 are actually part of the tether cables 46, the remainder of which are not shown in FIGS. 5 and 6 to simplify the drawings. Reference can instead be made to FIGS. 8 and 9 to better appreciate details of the second side 74 of the patch enclosure 44.

As shown in FIG. 8, in the embodiment shown there are twelve openings/ports 76 for passing up to twelve tether cables 46 through the second side 74 of the patch enclosure 44. A snout-like coupling element 112 is associated with each of the openings 76. The coupling elements 112 may be secured to the second side 74 of the patch enclosure 44 using bolts 114 or other fasteners (also see FIG. 9 for a better understanding). Sealing plugs or caps 120 are received in the coupling elements 112 so that the prior to installing a tether cable 46, the interior of the patch enclosure 44 can remain sealed off from the environment.

When installing a tether cable 46, the sealing cap 120 associated with the opening 76 for the tether cable 46 is removed from the coupling element 112. An end section of the tether cable 46 may then be passed through the opening 76 and into the interior of the patch enclosure 44. The tether cable 46 includes the furcation body 110, which is configured to be secured to the coupling element 112 by a mechanical interface, such as a bayonet connection, threaded connection, or connection using fasteners. As can be appreciated, FIG. 9 and the close-up inset in FIG. 8 illustrate a representative furcation body 110 secured to a representative coupling element 112; the other portions of the tether cable 46 are omitted to simplify the drawings. An o-ring 122 between the furcation body 110 and the coupling element 112 helps provide the seal for the connection.

Figure 10:
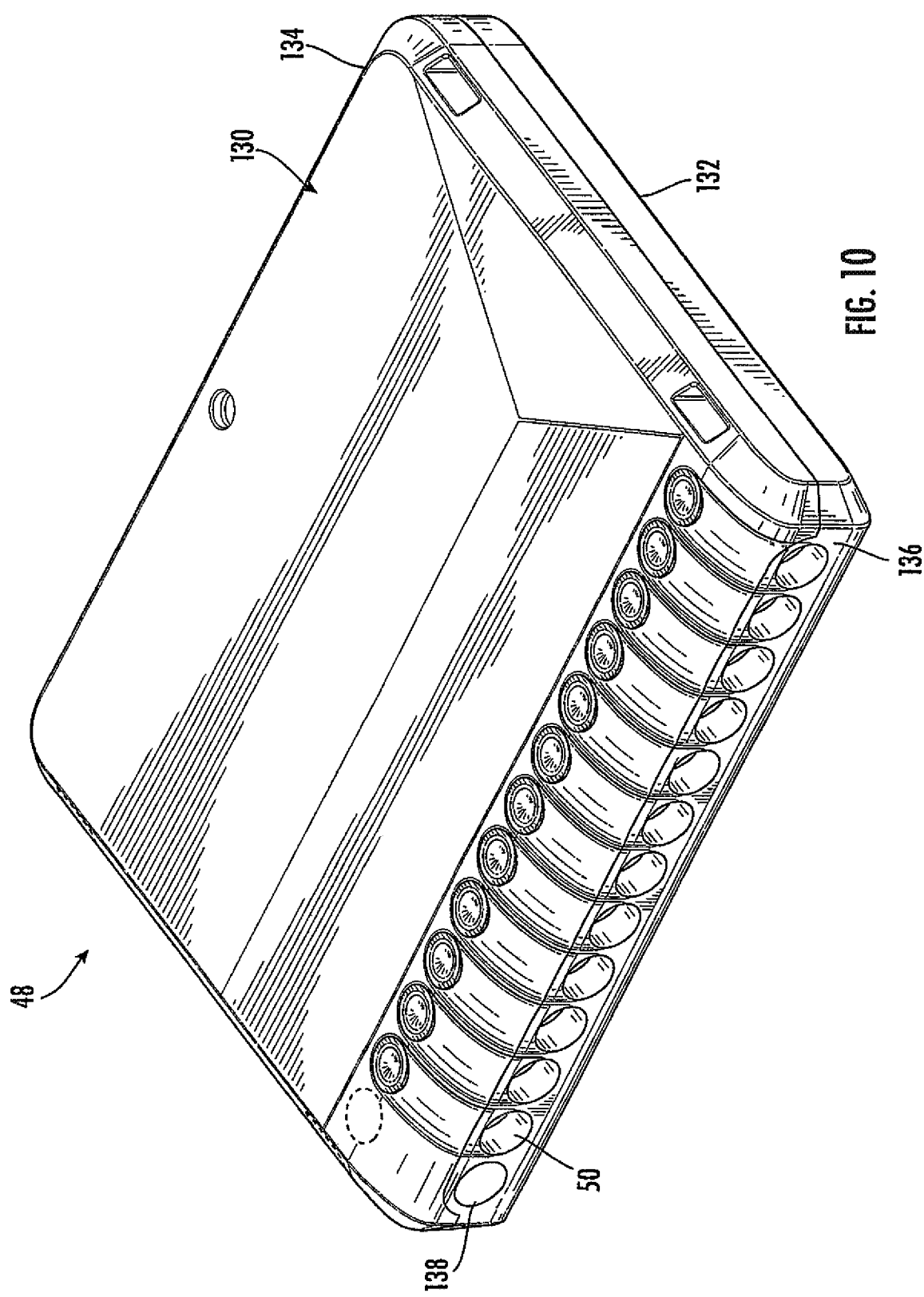
FIG. 10 is a perspective view of one of the outdoor multiport terminals of FIG. 4.

The tether cables 46 extend from the second side 74 of the patch enclosure 44 to respective multiport terminals 48, as mentioned above. FIG. 10 illustrates one of the multiport terminals 48 of FIG. 4 in isolation. The multiport terminal 48 includes a shell 130 having an upper portion 132 and a lower portion 134. The lower portion 132 defines a front face 136 that includes an inlet port 138 for one of the tether cables 46 and multiple connection ports 50 for the outdoor connectors 52 of the auxiliary cable 42. Twelve connection ports 50 are provided in the embodiment shown. Details relating to the connection ports 50 and outdoor optical connectors 52 configured to be received in the connector ports 50, and variants thereof, can be found in the Corning Pushlok Publications mentioned above, whose disclosures are fully incorporated herein by reference.

In some embodiments, optical distribution systems according to this disclosure may include the multiport terminals 48 arranged in a compact manner. For example, FIGS. 11 and 12 illustrates an arrangement where adjacent multiport terminals 48 partially overlap, with the connection ports 50 of each of the multiport terminals 48 remaining accessible. The multiport terminals 48 are arranged in two groups of six, but in alternative embodiments there may be a single group of overlapping multiport terminals 48 or more than two groups having the overlapping arrangement.

The overlapping arrangement of FIGS. 11 and 12 may be facilitated by a base or carriage 140 to which the multiport terminals 48 are removably secured. Each multiport terminal 48 may slide into or otherwise be received in a respective bay or receiving area 142 of the base 140 for the group of multiport terminals. The base 140 and multiport terminals 48 may be designed to engage each other when oriented correctly. Securing each multiport terminal 48 of a group to the associated base 140 also results in the multiport terminals 48 of that group being secured relative to each other. However, the multiport terminals 48 can still be removed from the base 140 independently of the other multiport terminals 48 in the group. This may make it easier for a technician to install the tether cable 46 and auxiliary cable 42 for a given one of the multiport terminals 48, as the technician can move the multiport terminal 48 to a nearby location that provides more space for completing the cable installations.

Figure 13:
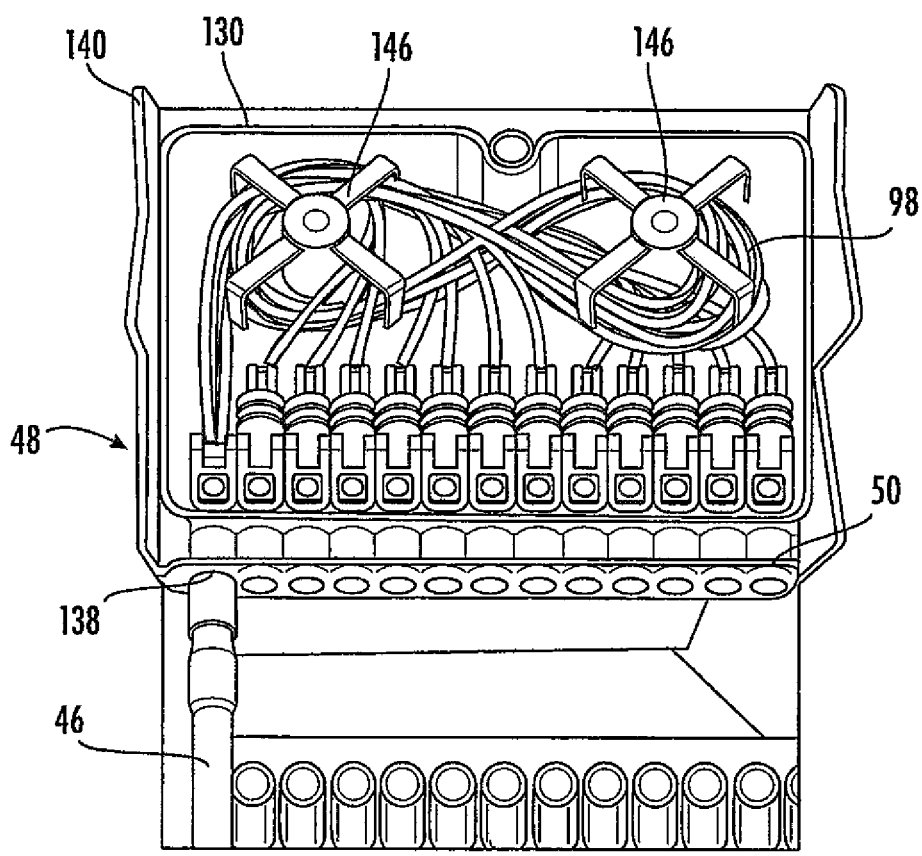
FIG. 13 is a close-up illustration of one of the outdoor multiport terminals of FIG. 11 with a portion of the outdoor multiport removed to illustrate how the associated outdoor tether cable may be received in an interior of the outdoor multiport terminal and routed to an interior side of connection ports on the outdoor multiport terminal.

FIG. 13 illustrates one of the multiport terminals 48 with the upper portion 132 (FIG. 10) of the shell 130 removed. The associated tether cable 46 extends through the inlet port 138 and into the interior of the multiport terminal 48. A sealed interface is maintained between the inlet port 138 and the tether cable 46, which carries groups of the optical fibers 98 (e.g., optical fiber ribbons). Within the multiport terminal 48, the optical fibers 98 are routed around slack management devices 146 and then to one of the connection ports 50. As mentioned above, the tether cables 46 are pre-terminated with optical connectors 148. Each optical connector 148 terminates one or more of the groups of optical fibers 98 and is received in the back side of a respective connection port 50.

The various optical connectors and ferrules according to this disclosure are multifiber connection interfaces, such as MPO-type connectors (e.g., according to IEC 61754-7-2: 2019 or TIA/EIA 604-5-F: 2019) and MT ferrules. Multifiber connection interfaces are required due to the large number of optical fibers and optical fiber connections associated with optical distribution systems according to this disclosure. The unique nature of the optical distribution systems can be characterized by a relationship between the various components that reflects the large number of terminations. For example, referring back to FIG. 2, the optical distribution system can be characterized by the following relationship:

$$F = C_F \times P \times T$$

wherein:
F=number of pre-terminated optical fibers carried by the backbone cable,
$C_F$=number of optical fibers terminated by each outdoor connector,
P=number of connection ports on each multiport terminal, and
T=number of multiport terminals (and corresponding number of outdoor tether cables),
and wherein:
$C_F \geq 12$
$P \geq 12$, and
$T \geq 12$, such that
$F \geq 1,728$.

The design of the optical distribution system and the relationship above distinguishes the optical distribution system from other applications where multiport terminals are used, such as fiber-to-the-home (FTTH) applications. Additionally, in FTTH networks, multiport terminals are typically used as additional branching points for the network, with an inlet cable being distributed to multiple drop cables extending from the connection ports to connect to different buildings or equipment. In the optical distribution system 40, the multiport terminals 48 do not further branch out a network. The auxiliary cables 42, for example, contain the same number of optical fibers as the tether cables 46 that connect the multiport terminals 48 to the patch enclosure 44.

In some embodiments, $C_F$, P, and T each equal 12 such that F equals 1,728. In other embodiments, $C_F$ equals 24 while P and T equal 12 such that F equals 3,456. Indeed, embodiments are possible where:
$12 \leq C_F \leq 24$,
$12 \leq P \leq 24$, and
$12 \leq T \leq 24$, such that
$1,728 \leq F \leq 13,824$.

The use of such a large number of pre-terminated optical fibers in a backbone cables has not been explored for outdoor applications involving vaults or other locations where equipment must be environmentally sealed. The patch enclosure 44 and tethered multiport terminals 48 therefore present a unique arrangement designed to address the specific challenges of large-scale data centers. Optical distribution systems according to this disclosure may not only be characterized by the relationships mentioned above, but also by relationships between the patch enclosure 44 and multiport terminals 48. For example, in some embodiments, the number of patch trays 62 within the patch enclosure 44 is equal to the number of multiport terminals 48 that can be tethered to the patch enclosure 44. Each patch tray 62 in such embodiments is configured to supports the connections to the backbone cable 12 that are associated with a respective one of the tether cables 46. Additionally, the tether cable 46 may be designed so that the number of connections on the associated patch tray 62 match the number of connections made by the tether cable 46 in the associated multiport terminal 48 (which corresponds to the number of connection ports 50). As a specific example, each tether cable may include 288 optical fibers and have ends terminated with connection interfaces that comprise or consist only of 24-fiber (24f) MT ferrules, thereby resulting in 12×24f MT ferrules associated with each end of each tether cable 46. The 12 MT ferrules on one end of the tether cable 46 are connected (i.e., patched) to 12×24f MT ferrules (or 12×24f MPO connectors that include such ferrules) on the patch trays 62, thereby resulting in 12 mated pairs of ferrules. Similarly, the 12 MT ferrules on the other end of the tether cable 46 (again, which may be part of 12×24f MPO connectors) are connected to 12×24f outdoor connectors using the twelve connection ports of the associated multiport terminal 48.

One advantage of the optical distribution system 40 is that the various buildings 14 can be connected to the network of the data center 10 without disrupting network traffic that may already exist on the backbone cable 12. For example, the backbone cable 12, patch enclosure 44, tether cables 46, and multiport terminals 48 may all be installed prior to connecting any of the buildings 14 to the network. Sometimes this is referred to as "day one" installation. Then, as buildings 14 are constructed or otherwise added to the data center 10, the buildings can be connected to the network of the data center 10 independently by connecting the associated auxiliary cables 42 to the corresponding multiport terminals 48. One or more buildings 14 may be connected and made operational as part of day one installations or as part of a first stage of data center operations. This means that the backbone cable 12 is used to handle network traffic to the buildings 14. The backbone cable 12 can remain operational when, at a later point in time, one or more additional buildings are connected to the network using respective auxiliary cables 42 and multiport terminal(s) 48 that are not already connected to buildings. This is due to the fact that the patch enclosure 44 can remain sealed/closed and that the connections to the existing, operational buildings are made using respective multiport terminals 48. In other words, for the previously-connected buildings, the associated connections between the backbone cable 12 and the tether cables 46, and between the tether cables 46 and the auxiliary cables 42, are not disrupted or potentially disrupted when connecting the new building(s) to the unused multiport terminal(s).

Figure 14:
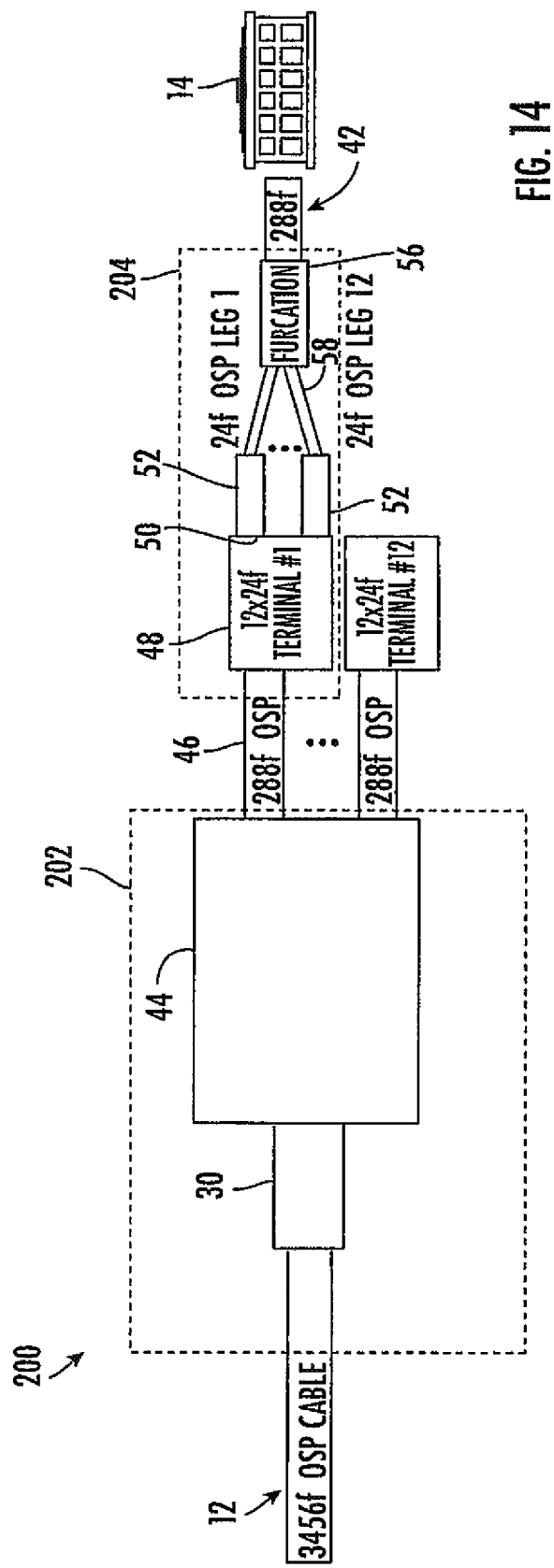
FIG. 14 is a schematic illustration of another embodiment of an optical distribution system for a data center according to this disclosure.

The are many alternatives and variations that will be appreciated by persons skilled in optical connectivity without departing from the spirit or scope of this disclosure. For example, FIG. 14 illustrates an optical distribution system 200 according to an alternative embodiment where the patch enclosure 44 and multiport terminals 48 are not placed in the same vault. The patch enclosure 44 is positioned in a first vault 202, and the tether cables 46 extend to one or more different vaults 204 that store the associated multiport terminal 48. The multiport terminals 48 may each be located in a respective vault 204, or there may be multiple multiport terminals 48 located in a given vault that is separate from the first vault 202.

Another alternative/variation relates to the enclosure that houses connections between the backbone cable 12 and the outdoor tether cables 46. The description above refers to "patch enclosure 44" for such enclosure because the connections are described as being between pre-installed connection interfaces (i.e., pre-terminated ends) of the backbone cable 12 and tether cables 46. Although a fully pre-terminated solution may provide certain advantages, this disclosure is not limited to such embodiments. In FIGS. 2 and 14, for example, element 44 may represent a splice enclosure in some embodiments according to this disclosure, with the splice enclosure being configured to store fusion splices between optical fibers carried by the backbone cable 12 and optical fibers carried by the outdoor tether cables 46. Many different configurations for splice enclosures are known to persons skilled in optical connectivity. Such enclosures may include splice trays similar to the patch trays 62, but with the splice trays being configured to store the fusion splice connections rather than the patch connections between two connection interfaces.

Other variations will be understood as being part of this disclosure by persons skilled in optical connectivity.

What is claimed is:

1. An optical distribution system for connecting buildings of a network, comprising:
   a backbone cable carrying a plurality of optical fibers, wherein the plurality of optical fibers carried by the backbone cable comprises F pre-terminated optical fibers, wherein the F pre-terminated optical fibers are terminated with a plurality of multifiber ferrules, and wherein each multifiber ferrule of the plurality of multifiber ferrules terminates a multiple of eight or twelve optical fibers;
   an enclosure configured to provide a sealed interior into which an end portion of the backbone cable extends;
   a plurality of tether cables having optical fibers connected to the optical fibers of the backbone cable within the sealed interior of the enclosure, wherein each tether cable of the plurality of tether cables extends from the enclosure; and
   a plurality of multiport terminals that each receive an end portion of a respective tether cable of the plurality of tether cables, wherein each multiport terminal of the plurality of multiport terminals is configured to maintain a sealed interface with the respective tether cable and includes a plurality of connection ports configured to receive a plurality of outdoor optical connectors on a front side of the plurality of connection ports, and wherein the optical fibers of the respective tether cable are pre-terminated with connection interfaces that are each received in a back side of a respective connection port of the plurality of connection ports;
   wherein:
      $C_F$=number of optical fibers of the plurality of tether cables that are terminated by each connection interface of the plurality of connection interfaces,
      P=number of connection ports on each multiport terminal of the plurality of multiport terminals, and
      T=number of multiport terminals in the plurality of multiport terminals; and
   further wherein:
      $C_F \geq 12$
      $P \geq 12$, and
      $T \geq 12$, such that
      $F \geq 1,728$.

2. The optical fiber distribution system of claim 1, wherein each multifiber ferrule of the plurality of multifiber ferrules terminates twelve or twenty-four optical fibers.

3. The optical fiber distribution system of claim 1, wherein the F pre-terminated optical fibers are terminated with a plurality of multifiber optical connectors that include the plurality of multifiber ferrules.

4. The optical fiber distribution system of claim 1, wherein:
   $12 \leq C_F \leq 24$,
   $12 \leq P \leq 24$, and
   $12 \leq T \leq 24$, such that
   $1,728 \leq F \leq 13,824$.

5. The optical fiber distribution system of claim 1, wherein:
   $C_F = 24$
   P=12, and
   T=12, such that
   F=3,456.

6. The optical fiber distribution system of claim 1, wherein the enclosure is a patch enclosure that includes a plurality of patch trays for managing mated connections between the optical fibers of the backbone cable and the optical fibers of the plurality of tether cables.

7. The optical fiber distribution system of claim 1, wherein the enclosure is a splice enclosure that includes a plurality of splice trays for managing fusion splices between the optical fibers of the backbone cable and the optical fibers of the plurality of tether cables.

8. The optical fiber distribution system of claim 1, further comprising:
   a plurality of auxiliary cables for connecting to the buildings, wherein each auxiliary cable of the plurality of auxiliary cables extends from a respective multiport terminal of the plurality of multiport terminals and is pre-terminated with a plurality of outdoor optical connectors that are received in the front side of the plurality of connection ports of the respective multiport terminal.

9. The optical fiber distribution system of claim 1, wherein the enclosure and the plurality of multiport terminals are located in a common vault.

10. The optical fiber distribution system of claim 1, wherein the enclosure is located in a first vault and the plurality of multiport terminals are located in one or more additional vaults.

11. The optical fiber distribution system of claim 4, wherein each multifiber ferrule of the plurality of multifiber ferrules terminates twelve or twenty-four optical fibers.

12. The optical fiber distribution system of claim 4, wherein the F pre-terminated optical fibers are terminated with a plurality of multifiber optical connectors that include the plurality of multifiber ferrules.

13. The optical fiber distribution system of claim 4, wherein the enclosure is a patch enclosure that includes a plurality of patch trays for managing mated connections between the optical fibers of the backbone cable and the optical fibers of the plurality of tether cables.

14. The optical fiber distribution system of claim 4, wherein the enclosure is a splice enclosure that includes a plurality of splice trays for managing fusion splices between the optical fibers of the backbone cable and the optical fibers of the plurality of tether cables.

\* \* \* \* \*